United States Patent
Litwin, Jr. et al.

(10) Patent No.: US 7,162,634 B2
(45) Date of Patent: Jan. 9, 2007

(54) METHOD FOR PROVIDING SECURITY ON A POWERLINE-MODEM NETWORK

(75) Inventors: Louis Robert Litwin, Jr., Plainsboro, NJ (US); Kumar Ramaswamy, Plainsboro, NJ (US); Michael Anthony Pugel, Noblesville, IN (US)

(73) Assignee: Thomson Licensing, Boulogne (FR)

( * ) Notice: Subject to any disclaimer, the term of this patent is extended or adjusted under 35 U.S.C. 154(b) by 740 days.

(21) Appl. No.: 09/837,288

(22) Filed: Apr. 18, 2001

(65) Prior Publication Data

US 2003/0028770 A1 Feb. 6, 2003

(51) Int. Cl.
*H04L 9/00* (2006.01)

(52) U.S. Cl. .................. 713/171; 380/278; 380/29; 455/402

(58) Field of Classification Search ............. 455/560, 455/3.3, 402; 713/171, 152; 380/18, 277–278, 380/29; 370/469, 463, 420; 340/310.01, 340/310.04, 310.06, 310.08, 310.11; 710/100
See application file for complete search history.

(56) References Cited

U.S. PATENT DOCUMENTS

| | | | |
|---|---|---|---|
| 4,985,919 A * | 1/1991 | Naruse et al. | 380/266 |
| 6,240,513 B1 * | 5/2001 | Friedman et al. | 713/152 |
| 6,363,449 B1 * | 3/2002 | Sides et al. | 710/100 |
| 6,370,396 B1 * | 4/2002 | Meiksin et al. | 455/560 |
| 6,438,691 B1 * | 8/2002 | Mao | 713/176 |

OTHER PUBLICATIONS

Menezes, Oorschot, Vanstone: "Handbook of Applied Cryptography" 1997, CRC Press, USA, (pp. 490, 498-499 and 528), XP000864294.

* cited by examiner

*Primary Examiner*—Kim Vu
*Assistant Examiner*—T. B. Truong
(74) *Attorney, Agent, or Firm*—Joseph J. Laks; Robert B. Levy; Joseph J. Kolodka

(57) ABSTRACT

A method for creating a secure powerline modem network transmits a private key (y) individually to each of the plurality of powerline modem devices (22) to be secured in a network such that each powerline modem device receives the private key in isolation of the network. Each of the plurality of powerline modem devices store the private key. A public key (X) is computed by a master device (32) in the network to be secured. The public key is transmitted from the master device to the plurality of devices. A shared key (Y) is computed at each of the plurality of powerline devices based on the public key and the private key, and communication within the secured network is performed by employing messages encrypted based on the shared key.

14 Claims, 2 Drawing Sheets

METHOD FOR PROVIDING SECURITY ON A POWERLINE-MODEM NETWORK

BACKGROUND

1. Technical Field

This disclosure relates to power-line modem networks, and more particularly, to a method which permits a user to create a secure network over a powerline when employing powerline modems.

2. Description of the Related Art

Powerline modems communicate by employing a power network as a transmission medium. Since modems in a plurality of locations share the power network, the shared powerline is a medium that permits a powerline modem in one house to "see" the powerline modems (and their data) at other locations, for example, other homes. Since the powerline is shared and is common to all homes data can be accessed freely over the powerline.

Therefore, a need exists for an apparatus and method where a user programs the same private key into all powerline modems that need to be secured. A further need exists for an apparatus and method which permits the user to program the private key into the modems without using the powerline network. This method would prevent other modems on the network from maliciously gaining access to the private key.

SUMMARY OF THE INVENTION

The present invention creates a secure powerline modem network by using a portable security device which includes a powerline modem. The security device is capable of randomly generating a number and may have the ability to let the user enter a number. This number is preferably stored in the portable security device, and the number will be a private key (y) for all of the modems on a given secured network. Each modem that needs to be secured is disconnected from the powerline modem network and then connected to the portable security device. The portable security device will provide power to the powerline modem of the device to be secured on the network, while simultaneously isolating the device's modem from the rest of the powerline modem network.

The portable security device then transmits the value of the private key to the other powerline modem device over their direct connection. Following this programming step, the powerline modem device is reconnected to the powerline network. Once all devices to be secured have been programmed in this manner, the master device on the network will transmit its public key (X). All powerline modems, both secured and unsecured, can hear this public key. Since all powerline modems that were programmed by the user's portable security device have the same private key, they are all able to compute a same shared key (Y) by mathematically combining the master's public key and their programmed private key (e.g., $Y=(X)^y$). All communication on the secured network is then encrypted using this same shared key.

A method for creating a secure powerline modem network transmits a private key individually to each of the plurality of powerline modem devices to be secured in a network such that each powerline modem device receives the private key in isolation of the network. Each of the plurality of powerline modem devices store the private key. A public key is computed by a master device in the network to be secured. The public key is transmitted from the master device to the plurality of devices. A shared key is computed at each of the plurality of powerline devices based on the public key and the private key, and communication within the secured network is performed by employing messages encrypted based on the shared key.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

Figure 1:
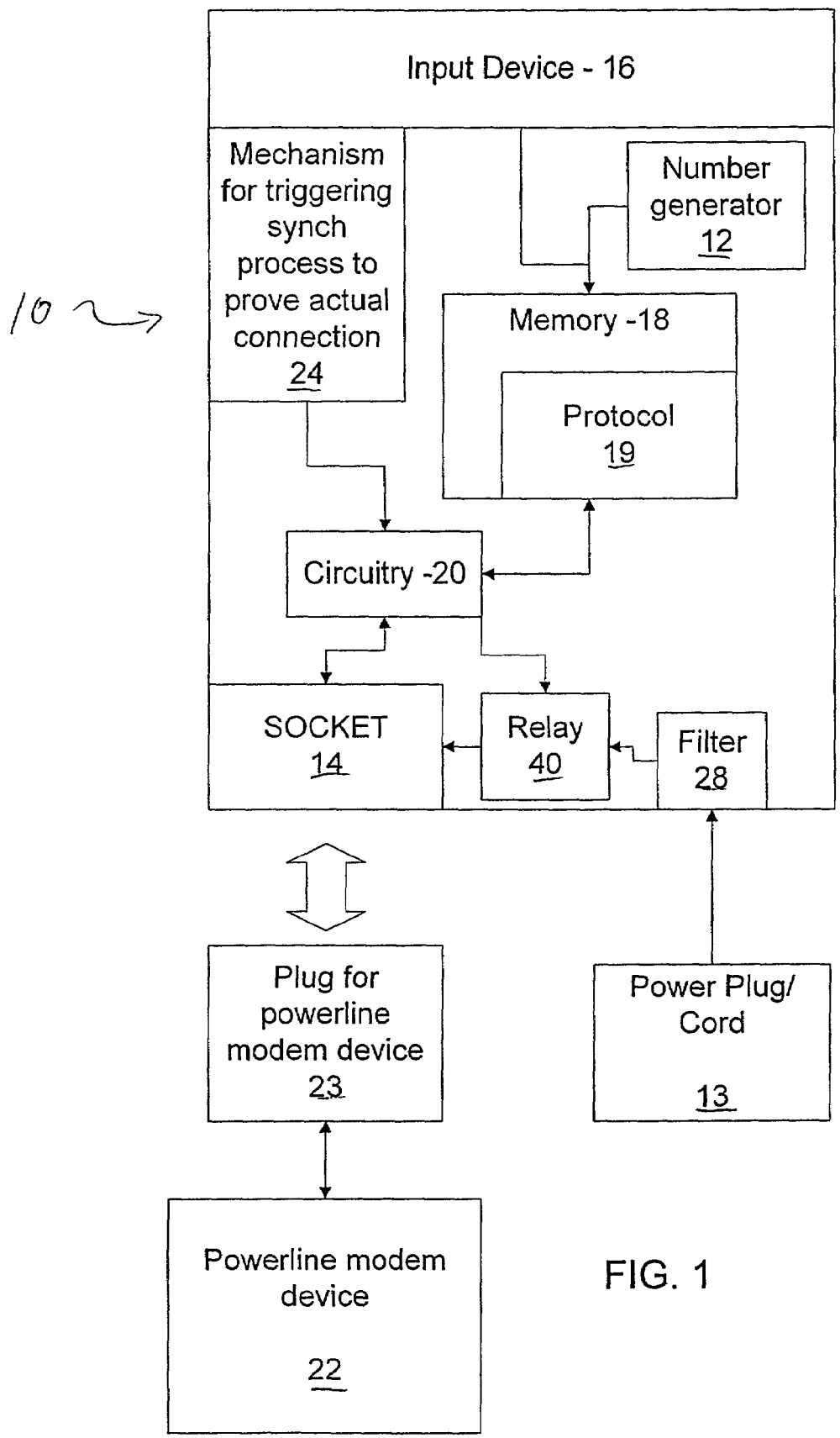
FIG. 1 is a block diagram showing a security synch device (SSD) in accordance with the present invention.

The present invention provides an apparatus and method for creating a secured powerline network. In one embodiment, powerline modem networks can be secured by the use of cryptographic algorithms known as ciphers. A cipher is a reversible mathematical algorithm that modifies the original input data. The output of the cipher is the "secured" version of the data and it is known as ciphertext. Most modem ciphers require the use of a number known as a key. This key may be a very large number, and the key acts as the seed for the cipher. That is, encrypting the same data with the same cipher but with different keys results in completely different ciphertext outputs. The intended recipient of the data will have knowledge of the key and can decrypt the data to restore it to its original form. Unintended recipients will not have knowledge of the key and it will ideally take them an enormous amount of time to try and decrypt the data by trying all possible key combinations.

The level of security in the system of the present invention may be scaled based on the size of the key. Small keys make the encryption/decryption process easier, but the security is weaker. Larger keys provide more security at the expense of encryption/decryption complexity.

In many practical applications, the type of cipher being used, as well as the details of the cipher itself, is known (e.g., provided on a data sheet). The security of such a system depends on keeping the value of the key secret since anyone who obtains knowledge of the key could decrypt the data.

Setting up a secure powerline modem network provides that each modem to be secured has knowledge of an agreed-upon key. Only those modems on the secured network will have knowledge of the key and this key can be used to encrypt all data transmitted among the secure modems. By keeping the value of this key secret, a secure powerline modem network can be implemented. However, secure communication is not possible until all intended modems have knowledge of the key. Until the modems know the key value, the modems can only communicate in an unsecured mode and any data transmitted in such a mode is susceptible to unintended interception.

One difficulty in setting up a secured network is determining a method for informing all modems of the value of the key. A unique ID may be imprinted on each modem when it is manufactured. The user sets up a secure network by typing in the IDs of all modems to be secured into a computer with a powerline modem. This modem will be the master of the network and the master modem knows the IDs of all of the modems that will be on the secure network. It can then communicate with those modems to establish a key to be used for secure communications. A number of methods exist for setting up such a key, for example, a public key agreement scheme such as Diffie-Hellman may be employed.

The public key agreement technique may work as follows. The powerline modem that is the master of the network broadcasts a value known as a public key and all the modems on the network (whose IDs have been programmed into the master) will respond with their own public keys. Any modem on the network, including devices belonging to other users, can receive the public keys. The devices that the user wishes to secure will mathematically combine the public key with their own private key. The private key is stored internally in each modem and its value is kept secret. By using well-known cryptographic techniques, the combination of the public key and the private key will allow each modem to agree on a shared key that is known only by the master and the respective modem. This shared key can be used to encrypt all data transmitted between the two devices. Using the same private key for all modems immediately gives each modem on the secured network the ability to communicate securely with any other secured modem since they would all compute the same shared key.

It is cumbersome for the user to type in the ID numbers for each modem on the network. These numbers would tend to be long and it may not be possible for the user to bring the device near the computer. For example, if the modem is included in a television or stereo, the user would have to write down the ID code, and then enter it into a computer, which controls the network. This only works if there is a computer on the network. It will not work for networks that do not have data entry devices such as keyboards. For example, this technique will not work for a network including only a stereo and networked speakers or multiple phones or a television and DVD player. There is also the possibility that a hacker will eavesdrop on the network and obtain the IDs of other modems. The hacker could then use the ID of another modem in an attempt to appear as one of the modems on the secure network.

The master device would need to use a different shared key for each modem since every modem on the network would have a different private key. For the modems to be able to communicate with modems other than the master, a new shared key would need to be agreed upon by all modems on the network.

The present invention provides an apparatus which provides security for a powerline modem system. In one embodiment, the apparatus include a security synch device (SSD) which randomly generates a number or permits a user to enter a number. This number is a unique identification number which identifies a powerline modem or a plurality of powerline modem systems (e.g., modems at a same location). One or more powerline modems or powerline modem enabled devices (PMEDs) are each connected directly to the SSD which sends or assigns this number to the modem device. Each device at a single location may include the same number as other devices at that location or a single location may include multiple numbers. Using the assigned number, mathematically encrypted messages can be sent such that only modems on the same network or modems having a predetermined type can communicate with each other. The present invention also provides a plurality of ways of proving to the powerline modems that the SSD is located near the powerline modem instead of the signal coming from a malicious user's location.

For modems having a unique identification (ID) number or key, a user enters these ID numbers into a computer with a powerline modem which is the master of the network. The computer knows that only the modems with the IDs that have been entered belong to its network, and it can encrypt its data for those modems. However, the user has to type in a number for each modem and also the network needs a personal computer to enter these numbers. Powerline modem networks may include only a stereo and speaker, or two phones, or a TV and VCR, etc., where no personal computer is present, and thus there is no way to enter these numbers into the network master modem. In addition, an unauthorized user can listen to the network to hear the IDs being broadcast and then pretend to be one of those modems by using another modem's ID.

Referring now in specific detail to the drawings in which like reference numerals identify similar or identical elements throughout the several views, and initially to FIG. 1, a security synch device (SSD) 10 is shown in accordance with one embodiment of the present invention. SSD 10 may include a box or other shape, which is preferably small in size (portable) and inexpensive. SSD 10 includes a power plug/cord 13 (to get power from the wall outlet) and a power socket 14 (to plug a powerline-modem-enabled device (PMED) into the SSD). SSD 10 includes a random number generator 12 which can generate a random number for use as a unique ID. SSD 10 may also include a keypad or other input device 16 to permit the user to enter a number for use as the unique ID. SSD 10 includes a memory device 18 for storing the ID numbers generated or entered. Memory device 18 may further include a protocol(s) 19 for communicating with PMEDs and an operating system for controlling system functions and interactions with a user. The protocols stored therein may be any protocol known in the art, for example, TCP. SSD 10 may also include other circuitry 20 such as a processor or other devices which perform other operations such as power distribution, data transfer, logic circuits etc. as will be described herein.

To create a secure network, the user will take SSD 10 around to each PMED 22 and plug or otherwise connect the PMED 22 into SSD 10 using a power plug 23 which normally is used to power device 22. Socket 14 is adapted to receive plug 23 and interface with PMED 22 in isolation from other devices. In one embodiment, a button or other mechanism 24 on the PMED 22 will be pushed to initiate a synch procedure. SSD 10 will transmit, for example, a low bit rate (so an inexpensive modem can be used in the SSD) number which may be randomly generated by SSD 10 or input by a user at input 16 to the PMED 22. The length of the number may be selected by the user to determine the level of security. The user will repeat this process for each PMED in the home or at the given location which will be permitted to share access of the same data. The synch procedure may only need to be done at the time of purchase of a PMED or when a new network is set up (say, a subnetwork in a home). Advantageously, the PMED being set up is isolated from the powerline network during this synchronization process. SSD includes a filter 28 which permits power to pass through and filters out all other frequencies (e.g., eliminates any data transfer). Thus, no other devices can hear this transaction.

Once this procedure is complete, all devices in a user's home will be loaded with the same number (or multiple numbers if subnetworks are employed). Other devices outside of the network will have a different number (or none at all). In this way, access devices with a common ID can communicate to the exclusion of other devices (for example, devices at other locations).

Figure 2:
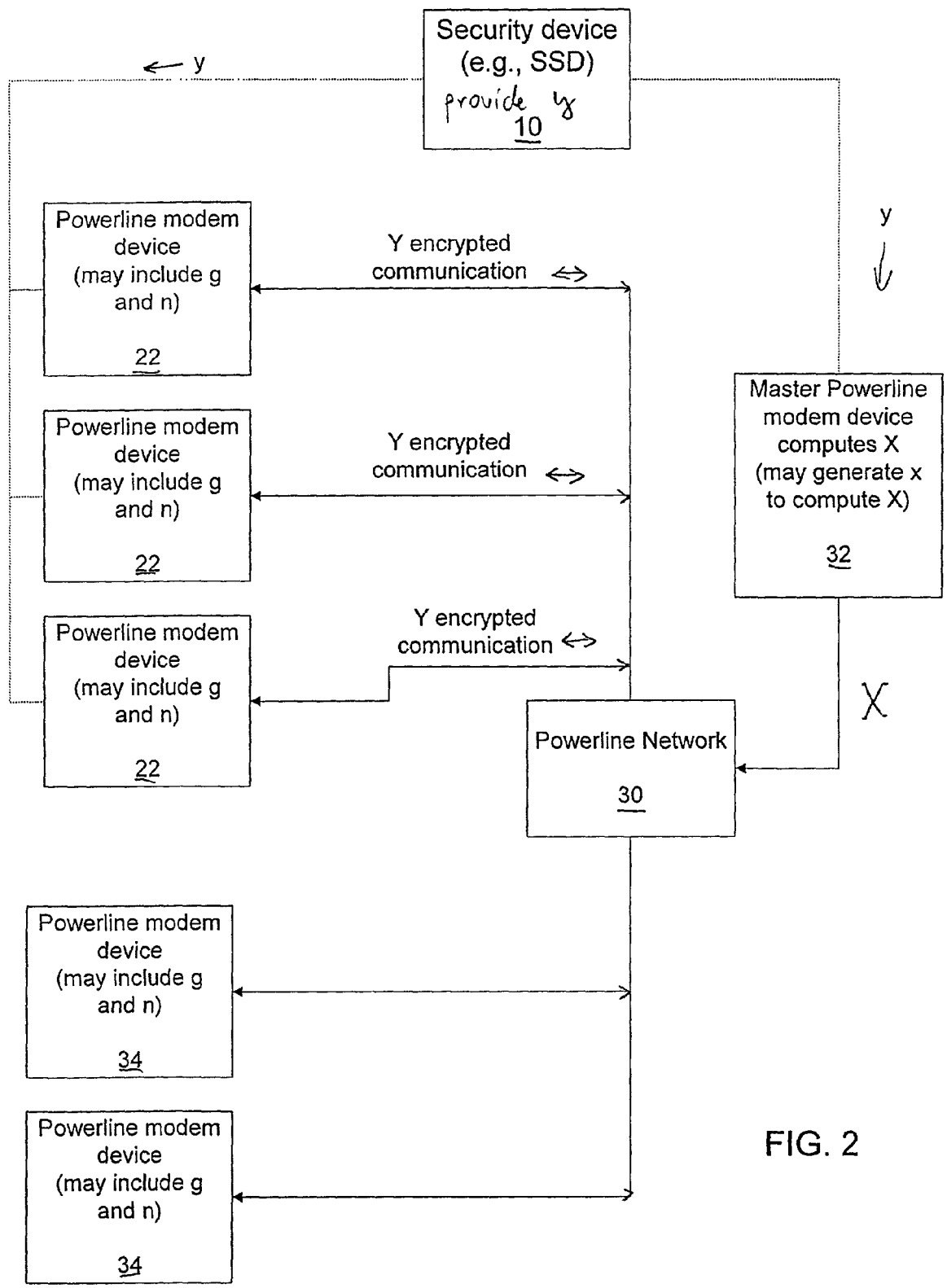
FIG. 2 is a block diagram showing a system/method for securing a powerline network in accordance with the present invention.

Referring to FIG. 2, in accordance with one embodiment, the procedure to set up a secure network is as follows. After PMED devices 22 on a network 30 negotiate, one device 32 becomes a master of the network. Assume that the number from the SSD 10 (FIG. 1) is y, a private key, and this number will be fixed for a duration on the network 30 (e.g., months or longer). The master 32 will select a number x and only the master will know this number. x can be a randomly generated private key, generated by the master. The master is also programmed with y from SSD 10. The devices will be programmed at the factory with two numbers, g and n. The master 32 will compute a public key, for example, $X=g^x$ mod n. Note that this is equivalent to exponentiation over a Galois (or finite) field of size n. Although this operation is easy to do, it is very difficult to compute x from X based on the mathematical fact that it is difficult to take logarithms over finite fields. Other computations and equations may also be employed.

In this example, the master 32 sends X out over the powerline network 30, and all devices (the user's 22 and devices 34 outside the network) can "hear" X. The master 32 also requests that each modem on the network respond with their unique ID number after encrypting the request message (and all others that follow) with a shared key, for example, $Y=(g^x)^y$ mod $n=(X)^y$ mod n. The modems for devices 22 will have received $X=g^x$ from the master 32, and they know y from the SSD 10. In FIG. 2, y is downloaded to devices 22 as described above with reference to FIG. 1, connections between SSD 10 and devices 22 are illustratively shown to indicate the origin of y. The master 32 will be able to decrypt the message since x is chosen by master 32 and the master 32 knows y from the SSD 10. Any messages sent by the other modems (devices 34) from a different network will not know y, and the master 32 will realize that the devices 34 are not on the same network. Thus, a network of PMEDs is secured without mistakenly including (or allowing a hacker to insert) other modems.

Other embodiments may include simpler or more complex security schemes. For example, after each device 22 is assigned a private key y. Master 32 generates a public key X and sends X to devices 22. A shared key Y is computed based on X and y at each device. (for example $Y=(X)^y$). Y is then employed for encrypted communications within the secured network.

Referring again to FIG. 1, instead of pushing a mechanical mechanism 24 to initiate synch (which needs a small button to be added to the PMED or SSD), there are other methods for initiating the synch process. The goal is for the PMED to be sure that the random number y is really coming from its owner's SSD 10, and not an unauthorized user's SSD or modem. Button 24 provides a way to prove that the SSD 10 is directly connected to the PMED (and not connected via the powerline from an unauthorized user's location). Making a user perform an overt act, e.g., to push a button on the PMED is one way of ensuring that the PMED is set up properly. A direct connection between SSD 10 and the device 22 may include a wireless radio frequency or infrared link. Instead of plug 23 and sockets 14, antennae are employed.

In another embodiment, a relay 40 may be provided in SSD 10. In this alternate embodiment, since the PMED will be receiving its power from the SSD 10, the SSD 10 can initiate a shutdown sequence of the PMED to prove that it is actually connected to the PMED. The PMED would then load the random number after the SSD turns power back on.

SSD 10 controls relay 40, which may be used to switch off the PMED and then switch the PMED back on. This proves to the PMED that the PMED is connected directly to SSD 10 and is not being connected to an unauthorized user.

SSD 10 may be employed for other uses as well. For example, SSD 10 may be employed to directly connect to a powerline modem enabled device using a full bandwidth of the modem (instead of sharing bandwidth with other devices on the powerline network). In addition, using the full bandwidth avoids impairments on a main powerline network. These advantages may be employed to, for example, quickly download audio, video, computer programs or other data onto a device. In one embodiment, software in a device 22 may be updated (e.g., user programs or device drivers) by downloading data or programs from memory 18 onto a device 22.

Having described preferred embodiments for methods which provide security on a powerline-modem network (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for creating a secure powerline modem network, comprising the steps of:
   transmitting a private key individually to each of the plurality of powerline modem devices to be secured in a network such that each powerline modem device receives the private key in isolation of the network by connecting each of the plurality of the powerline modem devices to a portable security device which transmits the private key directly to the powerline modem device in isolation from other powerline modem devices, each of the plurality of powerline modem devices store the private key;
   computing a public key, by a master device in the network to be secured;
   transmitting the public key from the master device to the plurality of devices;
   computing a shared key at each of the plurality of powerline devices based on the public key and the private key;
   computing the shared key includes the step of computing the shared key according to the following formula:
   $Y=(g^x)^y$ mod n, where Y is the shared key, g and n are numbers resident at each powerline modem device, x is the number generated at the master device and y is the private key; and
   communicating within the secured network by employing messages encrypted based on the shared key.

2. The method as recited in claim 1, wherein the step of computing a public key includes computing the public key, X, by the following formula:
   $X=g^x$ mod n, where g and n are numbers resident at each powerline modem device and x is the number generated at the master device.

3. The method as recited in claim 1, wherein the step of computing a shared key includes the step of computing the shared key according to the following formula:

$Y=(X)^x$, where Y is the shared key, y is the private key and X is the public key.

4. The method as recited in claim 1, wherein the step of transmitting a secured identification number includes proving an actual connection between the portable security device and the powerline modem device exists.

5. The method as recited in claim 1, further comprising the step of transmitting data to a powerline modem device from the portable security device.

6. The method as recited in claim 5, wherein the data includes a software update for a powerline modem device.

7. The method as recited in claim 1, wherein the step of transmitting a private key includes the step of transmitting a wireless signal to each of the plurality of the powerline modem devices to transmit the private key directly to the powerline modem device in isolation from other powerline modem devices.

8. The method as recited in claim 1, wherein the step of transmitting a private key includes triggering a transfer of the identification number by an act of a user.

9. The method as recited in claim 1, further comprising the step of providing the private key such that a length of the private key scales a level of security.

10. A method for creating a secure powerline modem network, comprising the steps of:

providing a security device capable of storing and transmitting a private key to a powerline modem device;

connecting the security device to each powerline modem device to be secured in a network;

transmitting a private key individually to each of the plurality of powerline modem devices to be secured in the network such that each powerline modem device receives the private key in isolation of the network and proving an actual connection between the security device and the powerline modem device exists, each of the plurality of powerline modem devices store the private key;

computing a public key, by a master device in the network to be secured;

transmitting the public key from the master device to the plurality of devices;

computing a shared key at each of the plurality of powerline devices based on the public key and the private key;

computing the shared key includes the step of computing the shared key according to the following formula:

$Y=(g^x)^y \mod n$, where Y is the shared key, g and n are numbers resident at each powerline modem device, x is the number generated at the master device and y is the private key; and communicating within the secured network by employing messages encrypted based on the shared key.

11. The method as recited in claim 10, wherein the step of computing a public key includes computing the public key, X, by the following formula:

$X=g^x \mod n$, where g and n are numbers resident at each powerline modem device and x is the number generated at the master device.

12. The method as recited in claim 10, wherein the step of computing a shared key includes the step of computing the shared key according to the following formula:

$Y=(X)^x$, where Y is the shared key, y is the private key and X is the public key.

13. The method as recited in claim 10, wherein the step of transmitting a private key includes the step of transmitting a wireless signal to each of the plurality of the powerline modem devices to transmit the private key directly to the powerline modem device in isolation from other powerline modem devices.

14. The method as recited in claim 10, wherein the step of transmitting a private key includes triggering a transfer of the identification number by an act of a user.

* * * * *

UNITED STATES PATENT AND TRADEMARK OFFICE
CERTIFICATE OF CORRECTION

| | | |
|---|---|---|
| PATENT NO. | : 7,162,634 B2 | Page 1 of 1 |
| APPLICATION NO. | : 09/837288 | |
| DATED | : January 9, 2007 | |
| INVENTOR(S) | : Louis Robert Litwin, Jr., Kumar Ramaswamy and Michael Anthony Pugel | |

It is certified that error appears in the above-identified patent and that said Letters Patent is hereby corrected as shown below:

In column 7, line 4, delete "$Y = (X)^x$" and insert therefore --$Y = (X)^y$--.

In column 8, line 27, delete "$Y = (X)^x$" and insert therefore --$Y = (X)^y$--.

Signed and Sealed this

Twenty-sixth Day of June, 2007

JON W. DUDAS
*Director of the United States Patent and Trademark Office*